United States Patent
Roy et al.

(10) Patent No.: US 8,448,220 B2
(45) Date of Patent: May 21, 2013

(54) MERGE RULE WIZARD

(75) Inventors: Jaideep Roy, Boca Raton, FL (US);
Scott DeLoach, Margate, FL (US);
David Diehl, Minneapolis, MN (US)

(73) Assignee: McAfee, Inc., Santa Clara, CA (US)

( * ) Notice: Subject to any disclaimer, the term of this patent is extended or adjusted under 35 U.S.C. 154(b) by 1022 days.

(21) Appl. No.: 12/432,045

(22) Filed: Apr. 29, 2009

(65) Prior Publication Data

US 2010/0037289 A1    Feb. 11, 2010

Related U.S. Application Data

(60) Provisional application No. 61/048,596, filed on Apr. 29, 2008.

(51) Int. Cl.
*H04L 29/00* (2006.01)

(52) U.S. Cl.
USPC ............ 726/1; 726/2; 726/3; 726/11

(58) Field of Classification Search
None
See application file for complete search history.

(56) References Cited

U.S. PATENT DOCUMENTS

| | | | |
|---|---|---|---|
| 6,009,475 A | 12/1999 | Shrader | |
| 6,606,710 B2 | 8/2003 | Krishnan et al. | |
| 6,826,698 B1 | 11/2004 | Minkin et al. | |
| 7,392,379 B2 | 6/2008 | Le Pennec et al. | |
| 7,856,434 B2 * | 12/2010 | Gluzman Peregrine et al. | 707/722 |
| 8,065,721 B1 * | 11/2011 | Shah | 726/13 |
| 8,132,251 B2 * | 3/2012 | Le Pennec et al. | 726/13 |
| 2003/0149766 A1 | 8/2003 | Syvanne et al. | |
| 2006/0129808 A1 | 6/2006 | Koti et al. | |
| 2006/0218280 A1 | 9/2006 | Gouda | |
| 2008/0289027 A1 | 11/2008 | Yariv et al. | |
| 2009/0007219 A1 | 1/2009 | Abzarian et al. | |
| 2009/0300748 A1 | 12/2009 | Diehl et al. | |

FOREIGN PATENT DOCUMENTS

WO    WO-2009148565 A1    12/2009

OTHER PUBLICATIONS

"U.S. Appl. No. 12/131,698, Non Final Office Action mailed Jun. 23, 2011", 16 pgs.
Katic, Tihomir, et al., "Optimization of Firewall Rules", Information Technology Interfaces ITI 2007, 29th International Conference, (2007), 685-690.
Yoon, Myungkeun, et al., "Reducing the Size of Rule Set in a Firewall", Communications ICC 2007 IEEE International Conference, (2007), 1274-1279.
International Application No. PCT/US2009/003337, Search Report mailed Aug. 25, 2009, 7 pgs.
International Application No. PCT/US2009/003337, Written Opinion mailed Aug. 25, 2009, 8 pgs.
International Application No. PCT/US2009/003337, International Preliminary Report on Patentability mailed Aug. 11, 2010, 11 pgs.

(Continued)

*Primary Examiner* — Jeffrey Pwu
*Assistant Examiner* — Helai Salehi
(74) *Attorney, Agent, or Firm* — Wong, Cabello, Lutsch, Rutherford & Brucculeri, LLP

(57) ABSTRACT

Various embodiments include a system comprising an interface coupled to a computer network, the interface operable to provide a merge rule wizard operable to generate one or more displayable dialog boxes that include selectable criteria for merging a plurality of sets of security rules into a single security rule base.

24 Claims, 9 Drawing Sheets

OTHER PUBLICATIONS

Al-Shaer, E., et al., "Conflict Classification and Analysis of Distributed Firewall Policies", *IEEE Journal on Selected Areas in Communications*, 23 (10), Sections VI, VII, (Oct. 2005), 2069-2084.

Al-Shaer, E., et al., "Firewall Policy Advisor for Anomaly Discovery and Rule Editing", Section 5, 7, Figures 6, 7 [Online] Retrieved from the Internet: <URL:http://www.mnlab.cs.depaul.edu/{ehab/papers/im03-cr.pdf>,, (Jul. 2008), 14 pgs.

Chomsiri, T., et al., "Firewall Rules Analysis", Proceedings of the 2006 International Conference on Security and Management, SAM '06, Sections 4.0, 5.0, 5.1, Figures 4, 5, 7-9, [retrieved on Aug. 11, 2009] Retrieved from the Internet: URL:http://ww1.ucmss.com/books/IFS/CSREA2006/SAM4015.pdf>, (Nov. 2006), 7 pgs.

"U.S. Appl. No. 12/131,698, Response filed Jan. 9, 2012 to Final Office Action mailed Nov. 10, 2011", 10 pgs.

"U.S. Appl. No. 12/131,698, Advisory Action mailed Jan. 19, 2012", 3 pgs.

"U.S. Appl. No. 12/131,698, Final Office Action mailed Nov. 10, 2011", 18 pgs.

"U.S. Appl. No. 12/131,698, Response filed Oct. 24, 2011 to Non Final Office Action mailed Jun. 23, 2011", 8 pgs.

\* cited by examiner

☐ MERGE RULES WIZARD

MERGE RULES
MERGE RULE GROUPS

|< < 3 OF 47 > >|

| LIST NUMBER | ENABLED | NAME | APPLY ON | LAST UPDATED | ACTION | SERVICES | SOURCES | DESTINATIONS | TIME PERIODS | SOURCE BLDGS | DESTINATION BLDGS |
|---|---|---|---|---|---|---|---|---|---|---|---|
| ⊞ [NOT USED] 1. MERGE GROUP: 87 MERGE CANDIDATE RULES |
| ⊞ [NOT USED] 2. MERGE GROUP: 87 MERGE CANDIDATE RULES |
| ⊟ [USED] 3. MERGE GROUP: 4 MERGE CANDIDATE RULES |
| ☑ 3 | TRUE | MERGE RESULT OF RickFing | amt005.ext.kk.test, amt007.ext.kk | 2/6/2008 3:06 PM | REJECT | RickFinger-services-1 | ANYWHERE | ANYWHERE | ANYTIME | | |
| ☑ -3 | TRUE | RickFinger-1 | amt005.ext.kk.test | 2/4/2008 10:23 AM | REJECT | RickFinger-services-1 | ANYWHERE | ANYWHERE | ANYTIME | | |
| ☑ -46 | TRUE | RickFinger-3 | amt005.ext.kk.test | 2/4/2008 10:42 AM | REJECT | RickFinger-services-1 | ANYWHERE | ANYWHERE | ANYTIME | | |
| ☑ -76 | TRUE | RickFinger-4 | amt005.ext.kk.test | 2/4/2008 10:48 AM | REJECT | RickFinger-services-1 | ANYWHERE | ANYWHERE | ANYTIME | | |
| ☑ -848 | TRUE | RickFinger-12 | amt005.ext.kk.test | 2/5/2008 11:01 AM | REJECT | RickFinger-services-1 | ANYWHERE | ANYWHERE | ANYTIME | | |
| ⊞ [NOT USED] 4. MERGE GROUP: 104 MERGE CANDIDATE RULES |
| ⊟ [NOT USED] 5. MERGE GROUP: 113 MERGE CANDIDATE RULES |
| ☐ | FALSE | | | | | | | | | | |
| ☐ 5 | FALSE | VoIP SIP_5 | amt005.ext.kk.test | 2/4/2008 10:23 AM | ALLOW | SIP | ANYWHERE | ANYWHERE | ANYTIME | INTERNAL | EXTERNAL |
| ☐ 20 | FALSE | VoIP SIP_6 | amt006.ext.kk.test | 2/4/2008 10:41 AM | ALLOW | SIP | ANYWHERE | ANYWHERE | ANYTIME | INTERNAL | EXTERNAL |

Fig. 4A

ALL RULES

| NUMBER △ | ENABLED | NAME | APPLY ON | LAST UPDATED | ACTION | SERVICES | SOURCES | DESTINATIONS | TIME PERIODS | SOURCE BLADES | DESTINATION BLADES |
|---|---|---|---|---|---|---|---|---|---|---|---|
| 1 | TRUE | CommandCenter in | ant005.ext.kk.test | 2/4/2008 10:23 AM | ALLOW | ccmd | CommandCenter serve | ANYWHERE | ANYTIME | EXTERNAL | |
| 2 | TRUE | CommandCenter out | ant005.ext.kk.test | 2/4/2008 10:23 AM | ALLOW | corns | Loopback | CommandCenter serve | ANYTIME | | FIREWALL EXTERNAL |
| 3 | TRUE | Merge Result of RickFing | ant005.ext.kk.test, ant00 | 2/6/2008 3:06 PM | REJECT | RickFinger services-1 | ANYWHERE | ANYWHERE | ANYTIME | | |
| 3 | TRUE | RickFinger-1 | ant005.ext.kk.test | 2/4/2008 10:23 AM | REJECT | RickFinger services-1 | ANYWHERE | ANYWHERE | ANYTIME | | |
| 4 | FALSE | InternetServices_5 | ant005.ext.kk.test | 2/4/2008 10:23 AM | ALLOW | Internet Services | ANYWHERE | ANYWHERE | ANYTIME | INTERNAL | EXTERNAL |
| 5 | FALSE | VoIP SIP_5 | ant005.ext.kk.test | 2/4/2008 10:23 AM | ALLOW | sip | ANYWHERE | ANYWHERE | ANYTIME | INTERNAL | EXTERNAL |
| 6 | FALSE | VoIP H.323_5 | ant005.ext.kk.test | 2/4/2008 10:23 AM | ALLOW | h323 | ANYWHERE | ANYWHERE | ANYTIME | INTERNAL | EXTERNAL |
| 7 | FALSE | NetMeeting_5 | ant005.ext.kk.test | 2/4/2008 10:23 AM | ALLOW | NetMeeting | ANYWHERE | ANYWHERE | ANYTIME | INTERNAL | EXTERNAL |
| 8 | TRUE | dnsp all to external resolv | ant005.ext.kk.test | 2/4/2008 10:23 AM | ALLOW | dns | ANYWHERE | DNS resolvers-ant005 | ANYTIME | | EXTERNAL |
| 9 | TRUE | Login Console_5 | ant005.ext.kk.test | 2/4/2008 10:23 AM | ALLOW | login | ANYWHERE | ANYWHERE | ANYTIME | FIREWALL | FIREWALL |
| 10 | TRUE | Admin Console_5 | ant005.ext.kk.test | 2/4/2008 10:23 AM | ALLOW | Admin Console | ANYWHERE | ANYWHERE | ANYTIME | | |
| 11 | FALSE | Secure Shell Server_5 | ant005.ext.kk.test | 2/4/2008 10:23 AM | ALLOW | sshd | ANYWHERE | ANYWHERE | ANYTIME | INTERNAL | INTERNAL |
| 12 | FALSE | SmartFilter Redirect_5 | ant005.ext.kk.test | 2/4/2008 10:23 AM | ALLOW | sfredirect | ANYWHERE | ANYWHERE | ANYTIME | | |
| 13 | FALSE | SmartFilter Admin_5 | ant005.ext.kk.test | 2/4/2008 10:23 AM | ALLOW | sfadmin | ANYWHERE | ANYWHERE | ANYTIME | | |
| 14 | FALSE | Passport_5 | ant005.ext.kk.test | 2/4/2008 10:23 AM | ALLOW | sspd | ANYWHERE | ANYWHERE | ANYTIME | | |
| 15 | TRUE | Deny All_5 | ant005.ext.kk.test | 2/4/2008 10:23 AM | REJECT | ALL SERVICES | ANYWHERE | ANYWHERE | ANYTIME | EXTERNAL | |
| 16 | TRUE | CommandCenter in_1 | ant006.ext.kk.test | 2/4/2008 10:41 AM | ALLOW | ccmd | CommandCenter serve | ANYWHERE | ANYTIME | FIREWALL | EXTERNAL |
| 17 | TRUE | CommandCenter out_1 | ant006.ext.kk.test | 2/4/2008 10:41 AM | ALLOW | corns | Loopback | CommandCenter serve | ANYTIME | | |
| 18 | TRUE | RickFinger_2 | ant006.ext.kk.test | 2/4/2008 10:41 AM | REJECT | RickFinger services | ANYWHERE | ANYWHERE | ANYTIME | INTERNAL | EXTERNAL |
| 19 | FALSE | InternetServices_6 | ant006.ext.kk.test | 2/4/2008 10:41 AM | ALLOW | Internet Services | ANYWHERE | ANYWHERE | ANYTIME | INTERNAL | EXTERNAL |
| 20 | FALSE | VoIP SIP_6 | ant006.ext.kk.test | 2/4/2008 10:41 AM | ALLOW | sip | ANYWHERE | ANYWHERE | ANYTIME | INTERNAL | EXTERNAL |
| 21 | FALSE | VoIP H.323_6 | ant006.ext.kk.test | 2/4/2008 10:41 AM | ALLOW | h323 | ANYWHERE | ANYWHERE | ANYTIME | INTERNAL | EXTERNAL |
| 22 | FALSE | NetMeeting_6 | ant006.ext.kk.test | 2/4/2008 10:41 AM | ALLOW | NetMeeting | ANYWHERE | ANYWHERE | ANYTIME | INTERNAL | EXTERNAL |
| 23 | TRUE | dnsp all to external resolv | ant006.ext.kk.test | 2/4/2008 10:41 AM | ALLOW | dns | ANYWHERE | DNS resolvers-ant006 | ANYTIME | | EXTERNAL |
| 24 | TRUE | Login Console_6 | ant006.ext.kk.test | 2/4/2008 10:41 AM | ALLOW | login | ANYWHERE | ANYWHERE | ANYTIME | FIREWALL | FIREWALL |
| 25 | TRUE | Admin Console_6 | ant006.ext.kk.test | 2/4/2008 10:41 AM | ALLOW | Admin Console | ANYWHERE | ANYWHERE | ANYTIME | | |
| 26 | FALSE | Secure Shell Server_6 | ant006.ext.kk.test | 2/4/2008 10:41 AM | ALLOW | sshd | ANYWHERE | ANYWHERE | ANYTIME | INTERNAL | INTERNAL |

STEP 4 OF 5

[BACK] [NEXT>] [CANCEL]

Fig. 4B

MERGE RULES WIZARD

RESULTS

SUMMARY
- NUMBER OF MERGES: 7
- NUMBER OF DELETED RULES: 32
- NUMBER OF RULES: 32

NEW RULE SET:

| NUMBER | ENABLED | NAME | APPLY ON | LAST UPDATED | ACTION | SERVICES | SOURCES |
|---|---|---|---|---|---|---|---|
| 1 | TRUE | MERGE RESULT OF COMMA | myclust, firewall2.int.rack8.dfb.test | 8/30/2007 1:2 | ALLOW | ccmd | CommandCenter server |
| 2 | TRUE | MERGE RESULT OF COMMA | myclust, firewall2.int.rack8.dfb.test | 8/30/2007 1:2 | ALLOW | ccms | FIREWALL |
| 3 | TRUE | MERGE RESULT OF ENTRELAY | myclust, firewall2.int.rack8.dfb.test | 8/30/2007 1:2 | ALLOW | Admin Console, entrelay | ANYWHERE |
| 4 | TRUE | MERGE RESULT OF INTERNET | myclust, firewall2.int.rack8.dfb.test | 8/30/2007 1:2 | ALLOW | h323, Internet Services, | ANYWHERE |
| 5 | TRUE | MERGE RESULT OF DNSPAL | firewall2.int.rack8.dfb.test, myclust | 8/30/2007 1:2 | ALLOW | dns | ANYWHERE |
| 6 | TRUE | MERGE RESULT OF LOGIN CO | myclust, firewall2.int.rack8.dfb.test | 8/30/2007 1:2 | ALLOW | login | ANYWHERE |
| 7 | TRUE | MERGE RESULT OF DENY ALL | myclust, firewall2.int.rack8.dfb.test | 8/30/2007 1:2 | REJECT | ALL SERVICES | ANYWHERE |

PRESS FINISH TO COMMIT CHANGES TO THE MANAGEMENT SERVER.

[ <BACK ] [ FINISH ] [ CANCEL ]

Fig. 6

MERGE RULE WIZARD

RELATED APPLICATION

This application claims the priority benefit of U.S. Provisional Application Ser. No. 61/048,596 filed Apr. 29, 2008, the content of which is incorporated herein by reference in its entirety.

FIELD OF THE INVENTION

The present invention is related to computer network security, and more particularly, to a system and method for computer network security rule management.

BACKGROUND INFORMATION

Network security on a computer network includes provisions made as part of the computer network's security policies. The security policies are most often under the control of a person or group of people, such as a network security administrator or administrators, who are responsible for the network security. The security policies are intended to protect the computer network, including one or more network-accessible resources, from unauthorized access.

Network security often begins with the authentication of all users who are attempting to access the computer network. Once authenticated, various mechanisms are used to enforce access policies, such as determining what services or resources available on the computer network are allowed to be accessed by the particular user having been authenticated by the network security. Network security may also include various audit functions intended to monitor the computer system for such things as un-authorized access to the computer network, un-authorized access to one or more of the resources of the computer network by an authenticated user, or improper use of one or more resources of the computer network by anyone accessing the computer network.

BRIEF DESCRIPTION OF THE DRAWINGS

FIG. 4A and FIG. 4B show a diagram of another illustrative dialog box according to various embodiments;

FIG. 6 shows a diagram of another illustrative dialog box according to various embodiments;

DETAILED DESCRIPTION OF THE INVENTION

Figure 1:
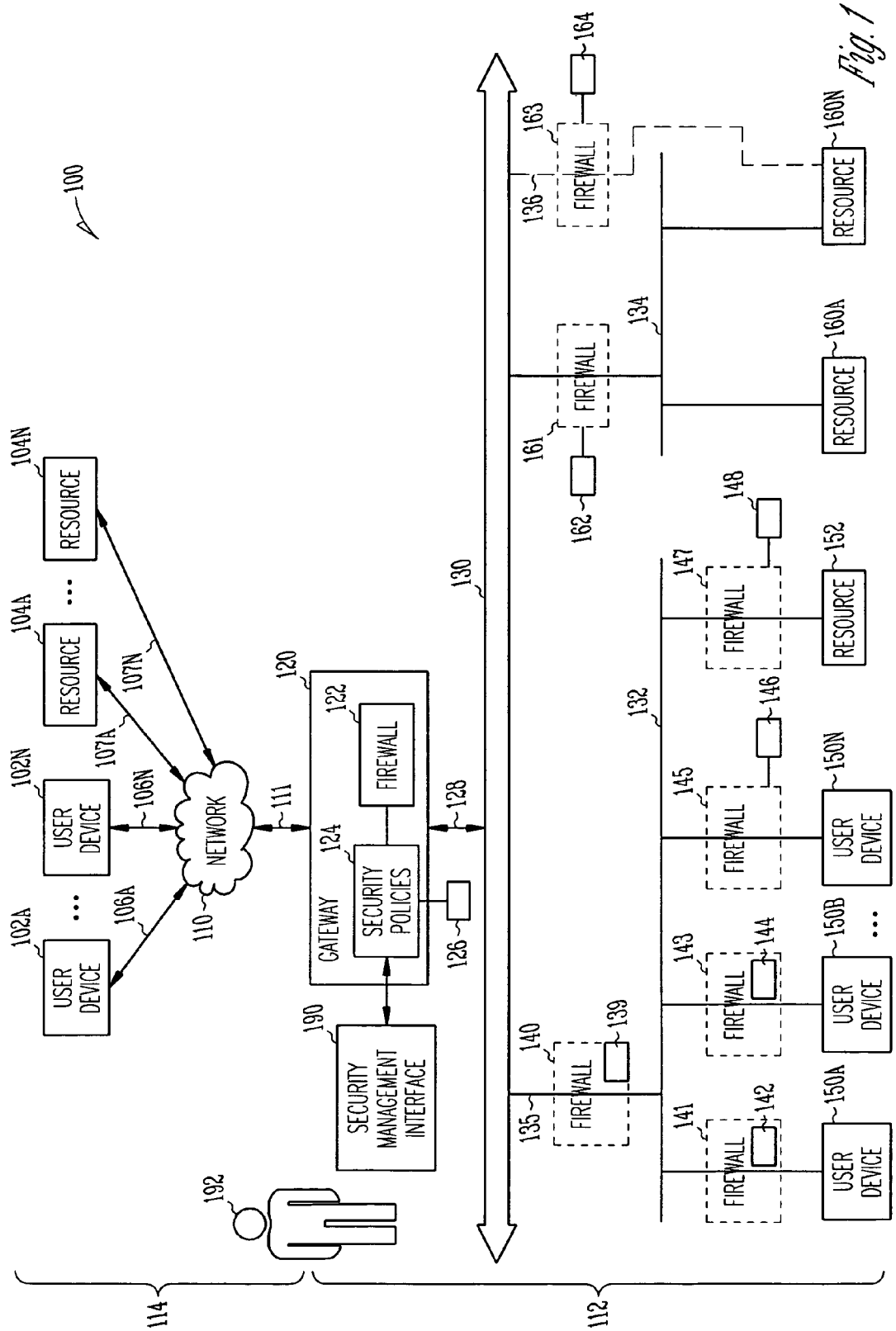
FIG. 1 shows a computer network having security rules according to various embodiments.

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

The apparatus, systems, and methods of the various embodiments described herein allow a network security administrator of a computer network to merge various sets of security rules to form a security rule base, to merge new security rules into one or more existing security rule bases, and to locate and delete obsolete and duplicate security rules, among other features. A security rule base includes set or sets of security rules that govern any security related functions of a computer system, including but not limited to governing of security policies associated with the computer network, governing of authenticating users who are authorized to access the computer system, governing accesses to and from any of the resources on the computer network, and governing access to and from the computer network invoking resources and networks external to the computer network.

In various embodiments, one or a combination of these features provides a more manageable security rule base. Embodiments allow the network security administrator, via a merge rule wizard, to establish some selection criteria by which to merge together one or more sets of security rules. The merge rule wizard provides a tool for improving performance and maintenance of a security rule base. Various embodiments include security rule analysis features that allow a network security administrator to receive warnings when adding a new rule (or combining rules) that potentially change the entire security policy by obsolescing one or more security rules at a lower level within the hierarchy of rules, or by obsolescing a rule that is lower in the order in which the security rules are considered.

In various instances of computer networks, security rules are applied at one or more firewalls within the computer network, and when taken as a whole form a security rule base. Over the period of administrating a firewall or groups of firewalls from a firewall manager or from an enterprise manager, there is a potential that the overall security rule base can get very large, cluttered, and cumbersome to manage. The security rule base can potentially get filled with duplicate security rules, or with disparate security rules that convey similar meaning. This is especially true when importing rules from different firewalls into a single enterprise manager.

Also, when adding new security rules to a security rule base, it is possible that the entire security rule set could change in meaning, or that the newly added security rule might negate an existing security rule below in the chain. Currently, a user on the computer networks will get no warning when this happens, and network security administrators are allowed to add or modify security rules at will. Thus, a resource that a user is authorized to have access to can be suddenly and without warning made unintentionally unavailable due to a network security administrator having added or modified a security rule that was not intended to affect the user's access to the resource.

Generally, it is the network security administrator's responsibility to study the security rule base and combine the security rules that make sense, or delete the security rules that already exist elsewhere in the security rule base. Also, when adding or modifying rules, it is once again the responsibility of the network security administrator to ensure that he or she does not accidentally negate the meaning of another security rule in the stack.

When the network security administrator attempts to perform these responsibilities manually, the process is prone to any one or more of the errors described above. As the size and complexity of the security rule base increases, the likelihood of such errors also increases.

The apparatus, systems, and methods of the various embodiments described herein provide solutions by implementing a merge rule wizard that includes automatic detection of similar security rules based on user-selectable criteria. Generally, a wizard is a user interface element wherein the user is led through a sequence of dialogs. In various embodiments, the user interface is a graphical user interface including a display, such as but not limited to a computer display, and one or more input devices, such as but not limited to a keyboard or a pointing device such as a cursor controlled by a computer mouse and the computer mouse buttons. In various embodiments, the graphical user interfaces includes a plurality of screen displays including one or more dialog boxes. Generally dialog boxes are a special window used in user interfaces to display information to the user, or to get a response if needed, or both to display information and to allow a user to input responses, all within the context of the dialog box.

FIG. 1 shows a computer network 100 having security rules according to various embodiments. Computer network 100 includes a plurality of user devices 150A-N coupled to a network connection 130. In various embodiments, computer network 100 includes one or more resources, such as resource 152, and resources 160A-N, coupled to network connection 130. In various embodiments, computer network 100 includes a gateway 120 coupling network connection 130 to one or more external networks represented as network 110. In various embodiments, connection 128 couples network connection 130 and gateway 120. In various embodiments, connection 111 couples gateway 120 and network 110. In various embodiments, external user devices 102A-N are coupled to network 110 through connections 106A-N. In various embodiments, external resources 104A-N are coupled to network 110 through connections 107A-N.

User devices are not limited to any particular type or types of user devices, and include any types of user devices operable to be coupled to a computer network such as computer network 100. In various embodiments, user devices include any one of, or any combination of, desktop computers, notebook computers, wireless/wired devices, mobile devices (such as cellular telephones, Personal Digital Assistants (PDAs)), media players (such as MP-3 devices), gaming consoles, set-top boxes, etc. Resources are not limited to any particular type or types of resources. In various embodiments, resources include any of, or any combination of, servers, computer terminals, computer workstations, computer storage devices such as Storage Area Networks (SANs) and Network-Attached Storage (NAS), and output devices such as printers and plotters.

In various embodiments, one or more of user devices 150A-N are coupled together on a network 132. In various embodiments, one or more resources, such as resource 152, are also coupled directly to network 132. Network 132 is coupled to network connection 130 through connection 135.

It would be understood the various network connections, networks, and interconnects as shown in FIG. 1 are illustrative, and are not limited to any particular type or types of networks, connections, and interconnects, and can include any types of busses, transmission lines, wireless connections, networks, and physical conductors operable to provide coupling of devices, interfaces, gateways, resources, and communication links between the various networks of computer network 100.

In various embodiments, one or more networks, such as network 110, include the Internet. The various connections, networks, and interconnects are not individually limited to a single network, and can include a plurality of networks, connections and interconnects including one or more different types of these operating using one or more protocols, as would be understood by one of skill in the art. The network communication can be any combination of wired and wireless communication. In some embodiments, the network communication may be based on one or more communication protocols (e.g., HyperText Transfer Protocol (HTTP), HTTP Secured (HTTPS), etc.). Networks can include any combination of Personal area networks (PAN), Local area networks (LAN), Campus area networks (CAN), Metropolitan area networks (MAN), and Wide area network (WAN).

In various embodiments, one or more of user devices 150A-N are connected to network 132 through one or a plurality of firewalls. Firewalls are not limited to any particular type or types of firewall, and include any type of hardware, software, or both hardware and software that is operable to regulate, and to in some instances block, the flow of data on the computer network as any given flow of data arrives at the firewall.

By way of illustration, user device 150A is coupled to network 132 through firewall 141, user device 150B is coupled to network 132 through firewall 143, and user device 150N is coupled to network 132 through firewall 145. It would be understood that in some embodiments, one or more of user devices 150A-N would be coupled to network connection 130 through a same firewall, such as firewall 140. In various embodiments, any combination of firewalls 140, 141, 143, and 145 can be used to couple user devices 150A-N to network connection 130. In various embodiments, resource 152 is coupled to network 132 through firewall 147.

Additional resources included in computer network 100 can be coupled to network connection 130 though one or more networks, such as network 134, and through one or more firewalls. By way of illustration, in various embodiments resources 160A-N are coupled to network 134. In and alternate embodiment, resource 160A is coupled to network 134, and resource 160N is coupled to network connection 130 through connection 136. In various embodiments, network 134 is coupled to network connection 130 through firewall 161. In embodiments including connection 136, resource 160N is coupled to network connection 130 through firewall 163.

In various embodiments, gateway 120 includes a firewall 122, through which network connection 130 is coupled to network 110. In various embodiments, gateway 120 includes security policies 124. Security policies 124 include the policies established to manage network security over the portion of computer network 100 that an authorized network security administrator has authority to control. By way of illustration, portion 112 of computer network 100 including gateway 120, network connection 130, networks 132 and 134, connection 128, user devices 150A-N, resource 152, and additional resources 160A-N, along with firewalls 122, 140, 141, 143, 145, 147, 161, and 163 when present, are the portion of computer network 100 over which the network security administrator has authority to control and that the network security administrator is responsible to provide and maintain security for.

Other devices, resources, networks, and connections are included in portion 114 of computer network 100. In various embodiments, these devices, resources, networks, and connection are considered "external" because they are outside the portion of the computer network 100 over which a network security administrator, represented as network security administrator 192 in FIG. 1, has authority or responsibility to provide and maintain network security over.

In various embodiments, each of user devices 150A-N are allowed to access some combination of other user devices 150A-N, resource 152, and additional resources 160A-N. In various embodiments, user devices 150A-N are allowed to access one or more of the user devices 102A-N in external portion 114. In various embodiments, one or more of user devices 150A-N are allowed to access one or more of resources 104A-N in the external portion 114. In various embodiments, one or more of the user devices 102A-N are authenticated to and are allowed to access one or more devices, resources, networks, and interconnects included in portion 112 of computer network 100.

It would be understood that an almost unlimited numbers of combinations of authorized accesses by any given devices and any given resources could be formed with various combination of the other user devices and other resources, both in portion 112 and in portion 114 of computer network 100. Security policies 124 include the security policies and the security rules and security infrastructure put in place to provide network security over portion 112 of computer network 100. Providing network security includes but is not limited to determining who is an authenticated user for any purposes on portion 112 of computer network, and determining what accesses are allowed for any given authenticated user, including allowed accesses by authenticated users within portion 112 to any user devices 102A-N and any resources 104A-N external to portion 112. Assess includes both requests coming from a user device or a resources, and requests to deliver communications, such as data, to a user device or a resource.

Security rules are based on the security polices, and are intended to enforce the security policies at each of the various user devices, resources, and various levels of computer network 100. In various embodiments, security rules are hierarchical. In various embodiments, the upper most level security rules apply to the entire portion 112. In various embodiments, these upper most level security rules are stored in security rules 126 coupled to security policies 124. In various embodiments, intermediate and lower level security rules, including security rules specific to a particular user device, or to a particular resource, or to a group of user devices or a group of resources, are stored as set of security rules distributed throughout portion 112 of computer network 100. In various embodiments, security rules are stored in a firewall that controls accesses to and from a user device, a resource, or a group including some combination of user devices, resources, or both user devices and resources.

By way of illustration, security rules 142 include security rules specific to what accesses are allowed to user device 150A, and what requests for access to other user device, resources, and networks are to be granted to user device 150A. Similarly, security rules 144 include specific rules for allowed access to and allowed requests for access from user device 150B, and security rules 146 include specific rules for allowed access to and allowed requests for access from user device 150N. In addition, in various embodiments security rules 148 include specific rules for allowed access to and allowed requests for access from resource 152. In various embodiments, these specific security rules are the lowest level of security rules since they apply to a very specify one or a very specific group of the user devices or resources on computer network 100.

In various embodiments, firewall 140 includes security rules 139. Security rules 139 include security rules that apply to allowed access to and requests for access from any of user devices 150A-N and resource 152 that are carried out over connection 135. Therefore, accesses between user device 150A and resource 152 can be carried out using security rules 142 and 146, but accessed to, or requests for access from user device 150A to network connection 130 involve security rules 142 and security rules 139.

In various embodiments, accesses to and requests for accesses from resource 160A are controlled by security rules 162 of firewall 161. Security rules 162 in various embodiments also controls access to and requests for accesses from resource 160N. In alternative embodiments, security rules 164 are use to control access to and requests for accesses from resource 160N.

In various embodiments, security rules, such as security rules 139, are intermediate level security rules. These intermediate level rules are meant to include rules that apply to the overall devices and resources through which access and requests for accesses must pass, but should be generic with regards to the specific accesses and requests for accesses of the individual devices and resources on network 132. By way of illustration, if any of the user devices 150A-N are allowed to access network connection 130, but only user device 150A is allowed to access resource 152, the intermediate rules controlling accessed by user devices 150A-N can be provided by security rules 139, wherein security rules controlling user devices 150A-N for access to resource 152 would need be stored at lower level, such as security rules 142 and 144, and 145, or in security rules 146.

Ideally, all the levels of hierarchy of security rules blend in a way so as harmonize with all the other rules in the security rules base so that none of the rules at the high level render inoperative or contravene the rules at any lower level, or a same level but in a different location. By way of illustration, if security rules 139 deny user device 150A access to resource 160A, but security rules 142 allow access of resource 160A by user device 150A, the rule in security rules 139 contradicts and makes inoperative at least this rule in security rules 142.

Management of the security rule base, and determining how and when the security rules in the security rule base will be deployed, modified, and audited are the responsibility of the network security administrator 192. In various embodiments, the network security administrator 192 accesses the security policies and the security rules included in the security rule base through a security management interface 190. In various embodiments, security management interface 190 is coupled to gateway 120. In various embodiments, security management interface 190 is coupled directly to security policies 124, and is operable to access, to monitor, to audit, and to modify the security rule base, including any of the security rules in portion 112 of computer network 100, through security policies 124.

In various embodiments, security management interface 190 is operable to allow the network security administrator 192 to view, monitor, modify, and test the security policies, and any of the security rules, included in portion 112 of computer network 100.

In various embodiments, security management interface 190 is operable to store instructions for and to provide a merge rule wizard for use in monitoring the security rule base, and for modifying the security rule base, including merging the securities rules from one or more sets of security rules into a single enterprise manager.

In various embodiments, the single enterprise manager creates a rule database that allows a network security administrator to add new rules, merge multiple sets of security rules, perform an analysis of an existing set of security rules, and to obsolete existing security rules. In various embodiments, the merge rule wizard generates and displays one or more displayable dialog boxes, wherein at least one of the dialog boxes includes user-selectable criteria for merging a plurality of sets of security rules into a single rule base.

In various embodiments, the single enterprise manager generates warning messages when a new rule being added to a set of exiting security rules will cause one or more of the existing security rules to be inoperative. In various embodiments, if a rule being added at a higher level in the security rules base contraindicates, and therefore renders inoperable, one or more security rules at a lower level of the security rules base, the single enterprise manager generates a warning. In various embodiments, the generated warning is a warning message displayed on a display device or an interface device, such as but not limited to security management interface 190.

In order to solve the problems of combining security rules to form a security rule base for a computer network, and to allow for an efficient way to add new rules and to detect and resolve conflicts between security rules, the network security administrator is provided with a merge rule wizard that allows him to select certain merge criteria, and based on these elected merge criteria, the merge rule wizard automatically presents to a user the rules that match those criteria as candidates for merging rules.

Further, features of the merge rule wizard allow a network security administrator to accept the proposed merger of security rules provided as merge rule candidates by the merge rule wizard. The merge rule wizard allows for custom editing by the network security administrator of the proposed merges presented as merge rule candidates by the merge rule wizard. The merge rule wizard provides warnings if a newly added security rule will render another existing security rule in the security rule base obsolete. In various embodiments, the merge rule wizard provides one or more displays of the complete set of the merged security rules for the network security administrator's review and acceptance for implementation as the security rule base.

These features allow the user of the merge rule wizard to import rules from several different sources, such as but not limited to firewall devices, into a single enterprise manager and to create a more manageable security rule base by running the merge rule wizard. Use of the merge rule wizard creates a security rule base that is easier to manage and that improves the performance of the enterprise manager system and the firewall devices.

Figure 2:
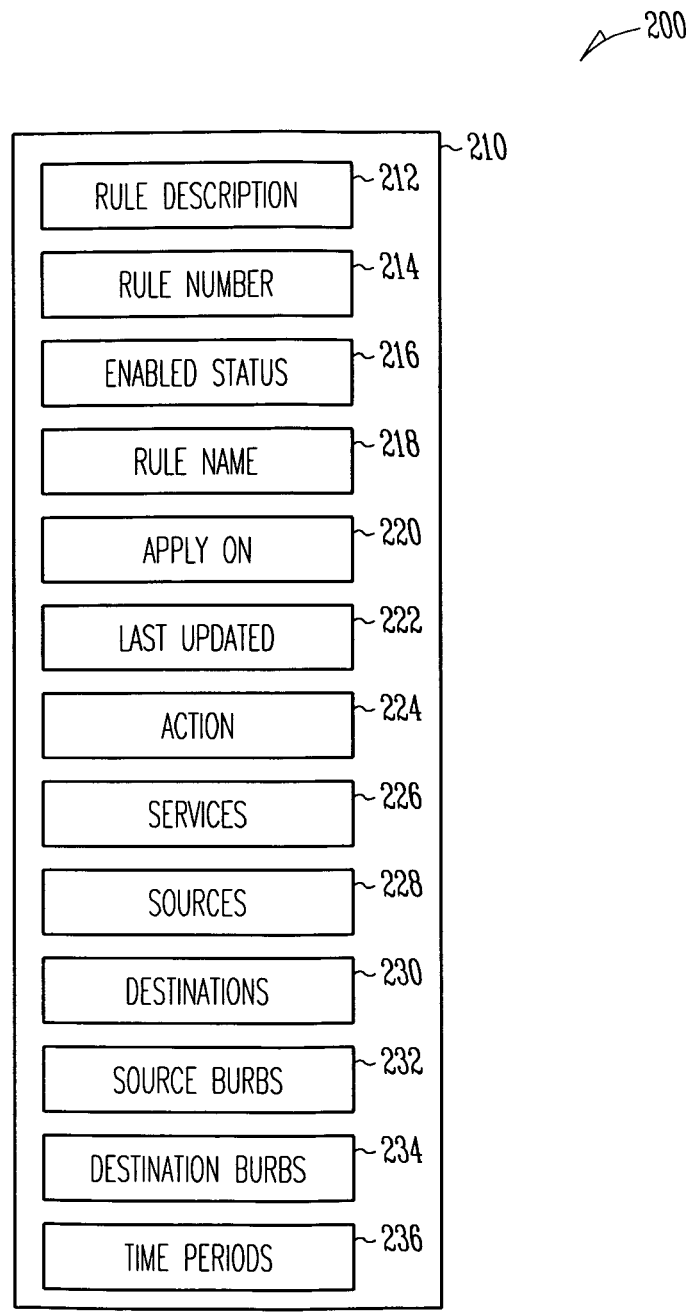
FIG. 2 shows a diagram of the elements of a security rule according to various embodiments.

FIG. 2 shows a diagram 200 of the elements of a security rule 210 according to various embodiments. In various embodiments, security rule 210 includes any combination of the following fields: Rule Description 212, Rule Number 214, Enabled Status 216, Rule Name 218, Apply On 220, Last Updated 222, Action 224, Services 226, Destinations 230, Source Burbs 232, Destination Burbs 234, and Time Periods 236. It would be understood that illustrative security rule 210 is intended to be illustrative of various fields that can be include in a security rule, but is not to be construed as limiting a security rule with regards to the number or types and combination of fields that can be included in a security rule operated on by a merge rule wizard as described herein.

In various embodiments, Rule Description 212 includes a text description of security rule 210. In various embodiments, Rule Number 214 includes a unique number assigned to illustrative security rule 210. In various embodiments, Rule Number 214 determines a ranking for security rule 210 within a security rule base, and in various embodiments dictates the hierarchy of security rule 210 with respect to any other rules within a security rule base that include security rule 210.

In various embodiments, Enabled Status 216 includes a status assigned to security rule 210. An assigned status can indicate that security rule 210 is enabled, or that security rule 210 is disabled. When disabled, the security rule 210 is not enforced, and when enabled, security rule 210 is enforced.

In various embodiments, Sources 228 includes a listing of sources that are allowed to access devices or resources controlled by rule 210.

In various embodiments, Destinations 230 includes a listing of destination that the devices and resources controlled by rule 210 are allowed to access. In various embodiments.

In various embodiments, Time Periods 236 includes designated time periods during which rule 210 is enforced. In various embodiments, Time Periods 236 includes a time up to and including a time when rule 210 is valid until the time including Time Periods 236, and expires, and thus is not enforced, following the time period included in Time Periods 236.

In various embodiments, any one or any combination of the fields in the security rules that are included in one or more sets of security rules form the elements that can have a user-selectable criteria assigned to each of the fields. Based on all of the user selectable criteria selected for the elements, the merge rule wizard is operable to automatically search a security rule base that includes the one or more sets of security rules, and to provide a listing of any candidate security rules that can be merged into a new or modified security rule based on the assigned user-selectable criteria.

Figure 3:
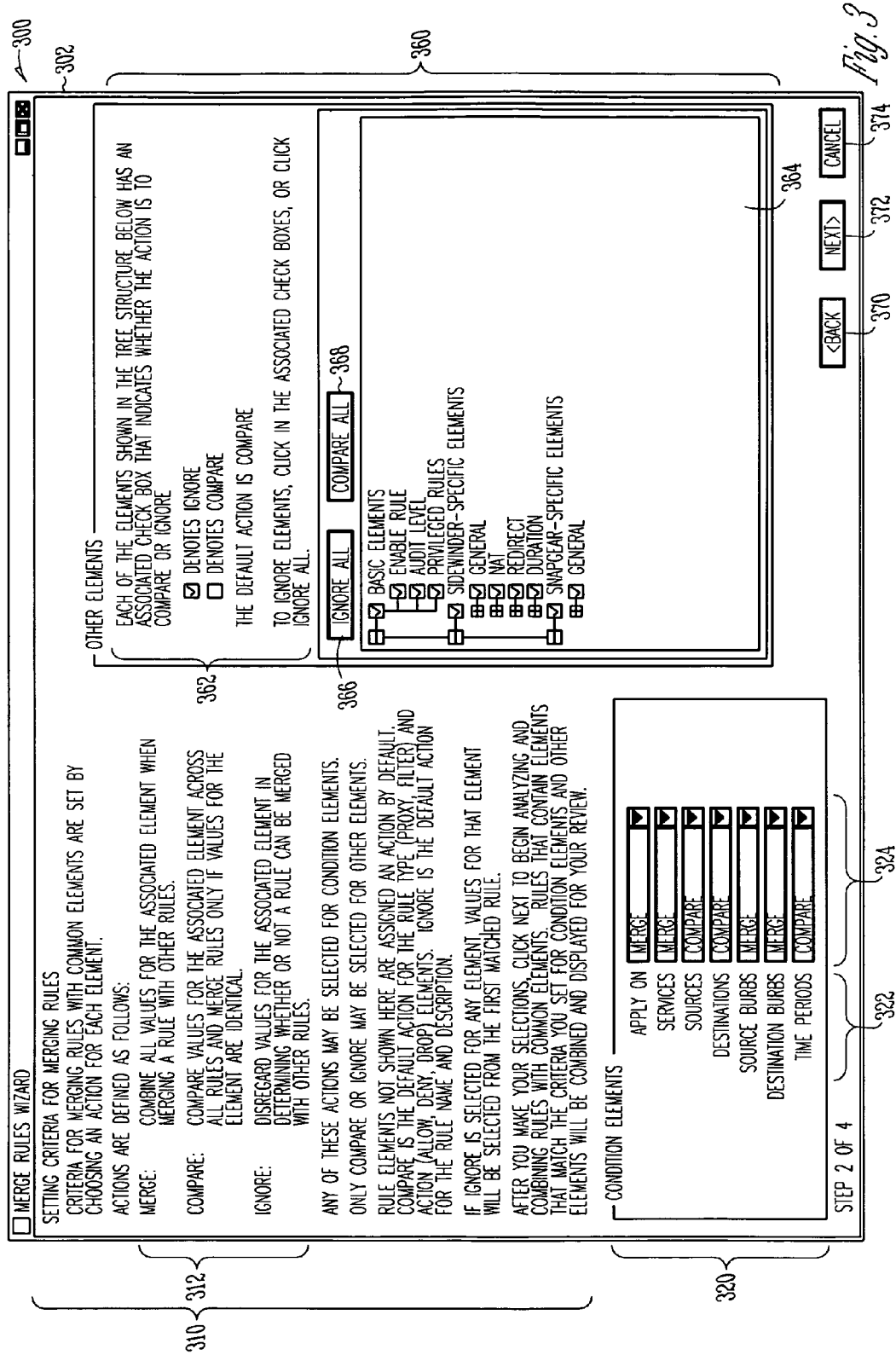
FIG. 3 shows a diagram of an illustrative dialog box of the merge rule wizard according to various embodiments.

FIG. 3 shows a diagram 300 of an illustrative dialog box 302 of the merge rule wizard according to various embodiments. In various embodiments, dialog box 302 is generated by the merge rule wizard and is displayed at a visual display being used to operate the merge rule wizard. In various embodiments, dialog box 302 includes and instruction section 310, a merge criteria selection section 320. In various embodiments, dialog box 302 includes an other elements criteria selection area 360.

In various embodiments, instruction section 310 includes any type of instructions for use by a user operating the merge rule wizard. In various embodiments, instruction section 310 includes a listing of the selection criteria 312 that are available to be selected for any given one of the common elements provided in the merge criteria selection section 320. In various embodiments, the selection criteria includes a "MERGE" criteria, a "COMPARE" criteria, and an "IGNORE" criteria.

In various embodiments, the "MERGE" criteria when selected for a given element combines all values for the associated element when merging a rule with other rules. In various embodiments, the "COMPARE" criteria when selected for a given element compares values for the associated elements across all rules and merges rules only if the values for the elements are identical. In various embodiments, the "IGNORE" criteria when selected for a given element disregards values for the associated element in determining whether or not a rule can be merged with other rules. In each of these descriptions for the "MERGE" criteria, the "COMPARE" criteria, and the "IGNORE" criteria, the rules refers to any rules included in security rule base being operated on by the merge rule wizard.

In various embodiments, merge criteria selection section 320 includes a list of elements 322 for which the merge rule wizard allows a selection of a criteria to be made for. For each one of the elements provided in the list of elements, there is an associated list of selection boxes 324. The selection boxes 324 are operable to allow a user to select one of the criteria that is to be applied to the associated element, By way of illustration, a criteria of "MERGE" has been selected as the criteria for the Apply On element in merge criteria selection section 320. The method for indicating the election of the criteria is not limited to any particular method, and includes typing in the name of the desired criteria, or using a pull down menu to select from the available list of criteria.

In various embodiments, the other elements criteria selection area 360 allows a user to select a criteria to be applied to one or more other elements, as displayed in the other elements display area 364.

In various embodiments, a selection of a box next to any given one of the other elements shown in the other elements display area 364 can be actuated by a user to select between one of two criteria applicable to the other elements. In various embodiments, an "Ignore All" selectable button 366 allows a user to apply an "IGNORE" criteria to all of the other elements available. In various embodiments, an "Compare All" selectable button 368 allows a user to apply an "COMPARE" criteria to all of the other elements available.

In various embodiments, a selectable "Back" button 370 is operable to allow a user to actuate the selectable "Back" button 370 in order to move to a previous screen in the merge rule wizard. In various embodiments, a selectable "Next" button 372 is operable to allow a user to actuate the selectable "Next" button 372 in order to move to a next screen in the merge rule wizard. In various embodiments, the actuation of the "Next" button 462 causes the merge rule wizard to generate and display a Merge Rule Groups screen, such as but not limited to the results screen as shown in FIG. 4. In various embodiments, a selectable "Cancel" button 374 is operable to allow a user to actuate the selectable "Cancel" button 374 in order to cancel the operations, and in some embodiments, to clear any criteria selections made by a user in the dialog box 302.

In operation, a user selects a criteria to be applied to one or more of the elements provided in merge criteria selection section 320. In various embodiments, a user can accept the a default criteria provided for any given one, or any combination of the elements in merge criteria selection section 320. A user then selects, or accepts one or more of the default settings for the common elements as provided in other elements criteria selection area 360. Once completed, a user indicates to the merge rule wizard that the criteria selection is complete and that the merge rule wizard is to run a query on the rules database based on the criteria selected, and to provide a listing of the merge rules candidates based on the selected criteria. In various embodiments the user indicates that the section of criteria is complete, and that the merge rules wizard is to run the query using the selected criteria by the user actuating the "Next" button 372. In various embodiments, the query is an Structured Query Language (SQL) query.

FIG. 4 shows a diagram 400 of another illustrative dialog box 402 of the merge rule wizard according to various embodiments In various embodiments, dialog box 402 includes a merge rule groups section 410. Merge rule groups section 410 includes any combination of the following columns: Use 412, Number 414, Enabled 416, Name 418, Apply On 420, Last Updated 422, Action 424, Services 426, Sources 428, Destinations 430, Time Periods 432, Source Burbs 434, and Destination Burbs 436.

Merge rule groups section 410 includes one or more rows 411 displayed under the columns. In various embodiments, each of rows 411 represents a different security rule from the security rule database that is being provided as a candidate security rule based on the selection criteria used to generate the dialog box 402.

In various embodiments, Use 412 provides an indication of whether the results is used or not used based on the proposed merging of security rules as generated by the merge rule wizard based on the merge selection criteria used to generate dialog box 402. Number 414 provides the security rule number, and Name 418 displays the security rule name.

In various embodiments, Apply On 420, Last Updated 422, Action 424, Services 426, and Sources 428 include the same type of element information as was described for the elements having the same descriptive label (i.e. Apply On, Last Updated, Action, Services, Sources, Destination) as was described in regards to the merge criteria selection section 320 in FIG. 3.

In various embodiments, the merge rule groups section 410 includes columns for Source Burbs 434. In various embodiments, the merge rule groups section 410 includes columns of Destination Burbs 436.

As shown by way of illustration, merge rule groups section 410 shows that rule number 1 and rule number 2 are not used, and that rule number 3 is a new candidate security rule for merging with rule numbers 46, 76, and 848 to form a new rule number 3 having the elements as shown in row 440. In various embodiments, the elements included in security rules that are indicated as being merged into a new rule are shown having the elements of the merged rules illustrated as text with a strikethrough, as shown by way of illustration but not limited to the four rows immediately below row 440. In various embodiments, the row that displays the proposed security rule as it is presented as a new candidate security rule, such as row 440, is illustrated having a background color that is different from the background color used in the rows or rows of the security rules that are to be merged into the proposed new candidate security rule, such as the four rows immediately below row 440.

In various embodiments, some of rows 411 are selectable by some form of user actuation, such as highlighting a row in the dialog box using entries from a keyboard, (not shown in FIG. 4), or by positioning a cursor (not shown in FIG. 4) over one of the selectable rows 411 and actuating an input, such as a mouse button, in order to select the row indicted by the position of the cursor.

Figure 5:
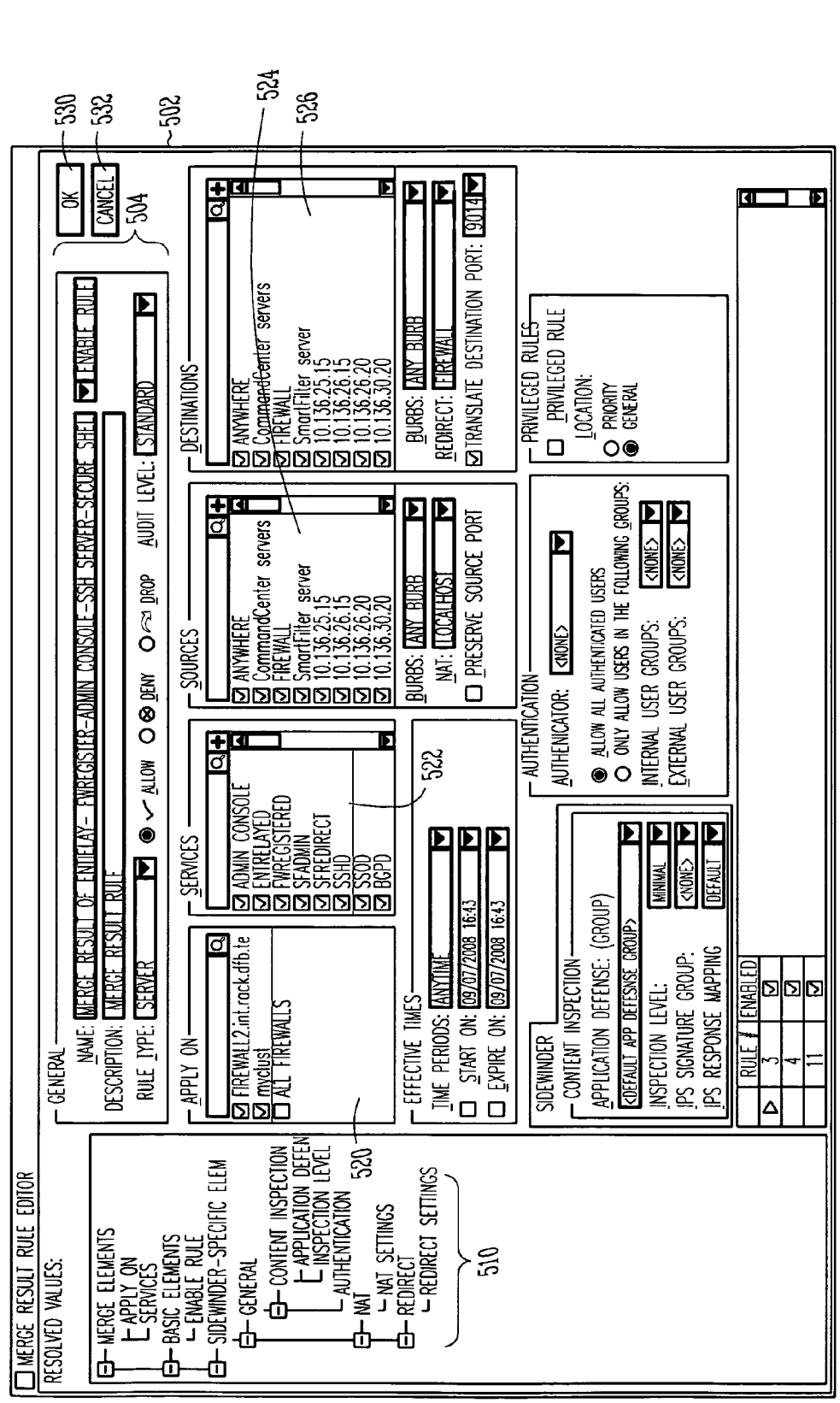
FIG. 5 shows a diagram of another illustrative dialog box according to various embodiments.

In various embodiments, selection of one of the rows 411 causes the merge rules wizard to generate and display a merge result editor screen, such as but not limited to the merge result rule editor screen shown in FIG. 5. As further described with respect to FIG. 5, a merge result rule editor screen allows a user to make changes to the proposed mergers of the new candidate security rules as provided in merge rule groups section 410.

Referring again to FIG. 4, in various embodiments, dialog box 402 includes all rules portion 450. In various embodiments, all rules portion 450 includes one or more of the columns included in merge rules groups section 410, and includes one or more rows 452 including a listing of a rule in each row with the information pertinent to the subject of the column header listed for each rule under the pertinent column. In various embodiments, the all rules portion 450 displays some portion of all of the security rules included in a security rule database on which the merge rules wizard is being run. In various embodiments, the rules are sorted by rule number in ascending order, and the all rules portion 450 is provided with a vertical scroll bar 454 that allows a user to actuate the vertical scroll bar in order to view different security rules of the security rules database.

In various embodiments, a selectable "Back" button 460 is operable to allow a user to actuate the selectable "Back" button 462 in order to move to a previous screen in the merge rule wizard. In various embodiments, a selection on the "Next" button 462 is operable to allow a user to actuate the selectable "Next" button 462 in order to move to a next screen in the merge rule wizard. In various embodiments, the actuation of the selectable "Next" button 462 causes the merge rule wizard to generate and display a results screen, such as but not limited to the results screen as shown in FIG. 6. In various embodiments, a selectable "Cancel" button 464 is operable to allow a user to actuate the selectable "Cancel" button 464 in order to cancel any operations pending with respect to dialog box 402.

FIG. 5 shows a diagram 500 of another illustrative dialog box 502 of the merge rule wizard according to various embodiments. In various embodiments, dialog box 502 is a merge rule editor screen including one or more selectable portions of the dialog box 502 that allow a user to edit the merge rule results from a set of new candidate security rules.

In various embodiments, dialog box 502 includes a merge element chart 510. In various embodiments, the merge element chart 510 displays one or more criteria used as the user-selectable criteria for common elements, basic elements, and other elements in a proposed merge rule group, such as any of the merge rule groups shown in FIG. 4.

Referring again to FIG. 5, dialog box 502 includes one or more edit boxes 520, 522, 524, and 526. The number of edit boxes is not limited to any particular number of edit boxes. In various embodiments, each of the edit boxes 520, 522, 524, and 526 includes a display of the settings included in a given element of the security rule indicated in security rule heading 504. In various embodiments, the security rule indicated in security rule heading 504 is a security rule selected for editing from the merge rule groups dialog box, such a but not limited to the merge rule groups section 410 of FIG. 4.

Again referring to FIG. 5, each of edit boxes 520, 522, 524, and 526 is operable to allow a user to edit the settings for an element included in the security rule indicated in security rule heading 504. By way of illustration, edit box 520 allows a user to edit the settings for the "Apply On" element, edit box 522 allows a user to edit the settings for the "Services" element, edit box 524 allows a user to edit the settings for the "Sources" element, and edit box 526 allows a user to edit the settings for the "Destinations" element. In various embodiments, the element to be edited by any of the displayed edit boxes can be changed by actuation a selection on the merge element chart 510.

In various embodiment, selectable "Cancel" button 532 can be used to discard any edits made in dialog box 502. In various embodiments, a selection on the "Cancel" button 532 causes an exit from dialog box 502, and retunes the display provided by the merge rule wizard to a previous screen.

In various embodiments, selectable "OK" button 530 is operable to be actuated to allow a user to accept the edits done in the dialog box 502. In various embodiments, selection of the "OK" button 530 after one or more changes to the rule indicated in security rule heading 504 has been made results in the merge rule wizard re-running based on the edited version of the rule indicted in security rule heading 504 to determine and resolve an issues created by the edits, and to provide a display of the new candidate security rules based on the one or more changes. In various embodiments, if no changes have been made through the edit boxes of edit dialog box 502 while the dialog box 502 is being displayed, a selection on the "OK" button 530 causes an exit from dialog box 502, and retunes the display provided by the merge rule wizard to a previous screen.

FIG. 6 shows a diagram 600 of another illustrative dialog box 602 of the merge rule wizard according to various embodiments. In various embodiments, dialog box 602 is a merge rule "Results" screen. In various embodiments, the "Results" screen includes a plurality of rows 610 of new security rules that are included in the security rule base on which the merge rule wizard was run. In various embodiments, the "Results" screen includes a plurality of column 620 each having a header indicative of the subject matter included in the rows 610 under the given column.

In various embodiments, dialog box 602 includes a summary section 630 that includes one or more display indications of various statistics related to the operation of the merge rule wizard. In various embodiments, the statistics include but are not limited to any combination of statistics related to a number of merges, a number of deleted rules, and a (total) number of rules. In would be understood that some of these values for the statistics can be zero, wherein the merge rule wizard was run but did not result, for example, in an indication of any new candidate security rules that could form new merge rules based in the user-selected criteria used to perform the query. In various embodiments, such runs of the merge rule wizard result from audits run on a security rule base, wherein the run is performed on some periodic basis, such as weekly, to test the security rule base for unexpected or unauthorized changes. In some instances, and indication that no new candidate security rules were found is the expected result of running the merge rules wizard, wherein an indication of new candidate security rules can be an indication that there has been some unexpected or unauthorized changes to the security rules database.

In various embodiments, the dialog box 602 includes one or more selectable buttons, such as but not limited to a selectable "Back" button 670, a selectable "Finish" button 672, and a selectable "Cancel" button 674. In various embodiments, the selectable "Back" button 670 is operable to allow a user to actuate the selectable "Back" button 670 in order to move to a previous screen in the merge rule wizard. In various embodiments, a selectable "Finish" button 672 is operable to allow a user to actuate the selectable "Finish" button 672 in order to complete the running of the merge rule wizard, and to close the merge rule wizard application. In various embodiments, a selectable "Cancel" button 374 is operable to allow a user to actuate the selectable "Cancel" button 374 in order to cancel any operations initiated through dialog box 602.

Figure 7:
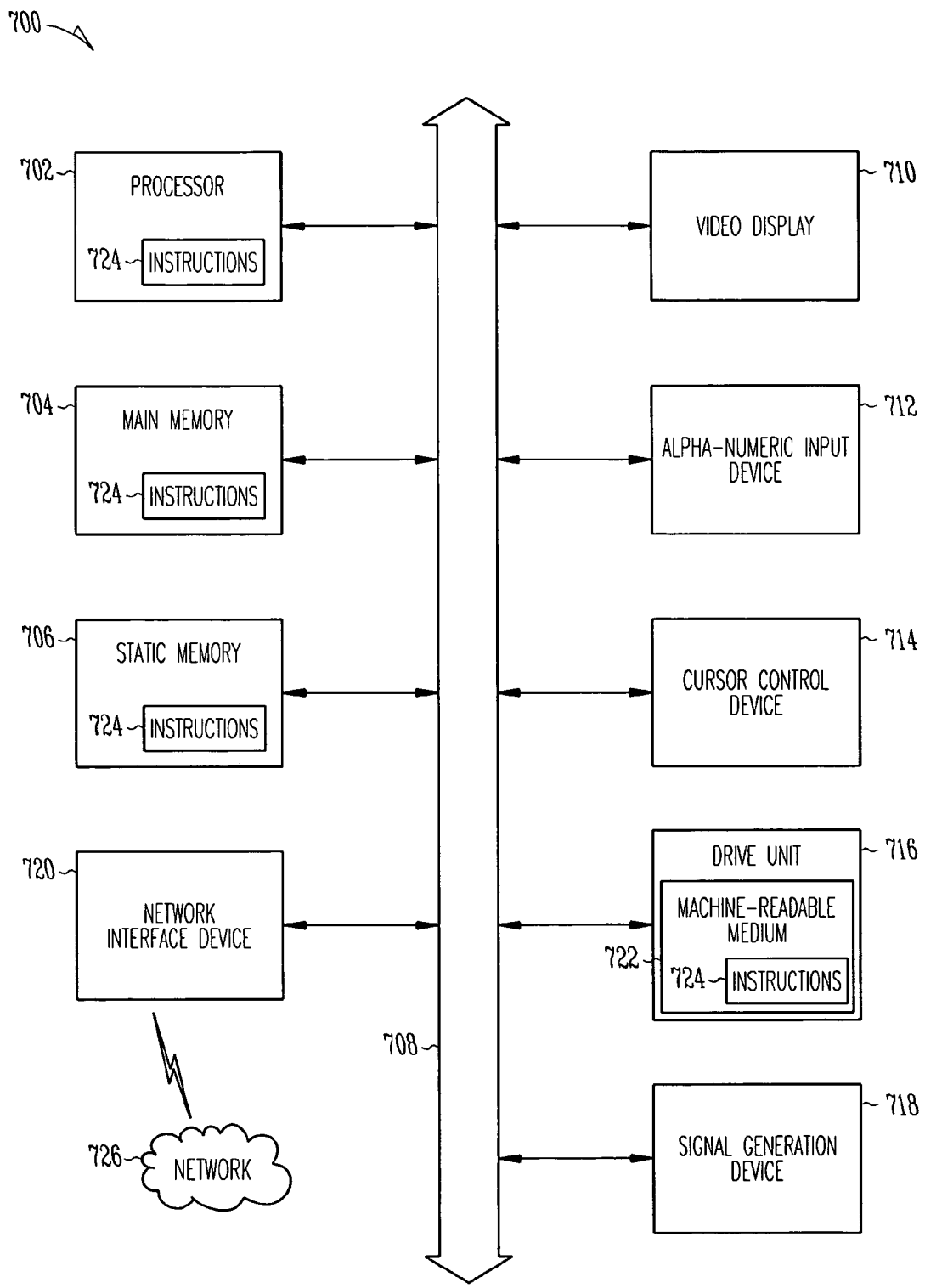
FIG. 7 shows an interface for a computer network according to various embodiments.

FIG. 7 shows an interface 700 for a computer network according to various embodiments. In various embodiments, interface 700 is a security management interface, such as but not limited to the security management interface 190 shown in FIG. 1. In various embodiments, interface 700 is a diagrammatic representation of a machine in the form of a computer system within which a set of instructions is stored on a memory device and which, when executed, cause the machine to perform any one or more of the methodologies discussed herein. In some embodiments, the machine operates as a standalone device. In some embodiments, the machine may be connected (e.g., using a network) to other machines. In a networked deployment, the machine operates in the capacity of a server or a client user machine in server-client user network environment, or as a peer machine in a peer-to-peer (or distributed) network environment.

In various embodiments, the machine comprises a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, IP telephone, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

In various embodiments, the interface 700 includes any combination of a processor 702 (e.g., a central processing unit (CPU), a graphics processing unit (GPU), or both), a main memory 704 and a static memory 706, which communicate with each other via a bus 708. In various embodiments, interface 700 includes a video display unit 710 (e.g., a liquid crystal display (LCD), a flat panel, a solid state display, or a cathode ray tube (CRT)). In various embodiments, interface 700 includes any combination of an input device 712 (e.g., a keyboard), a cursor control device 714 (e.g., a mouse), a disk drive unit 716, a signal generation device 718 (e.g., a speaker) and a network interface device 720.

Figure 8:
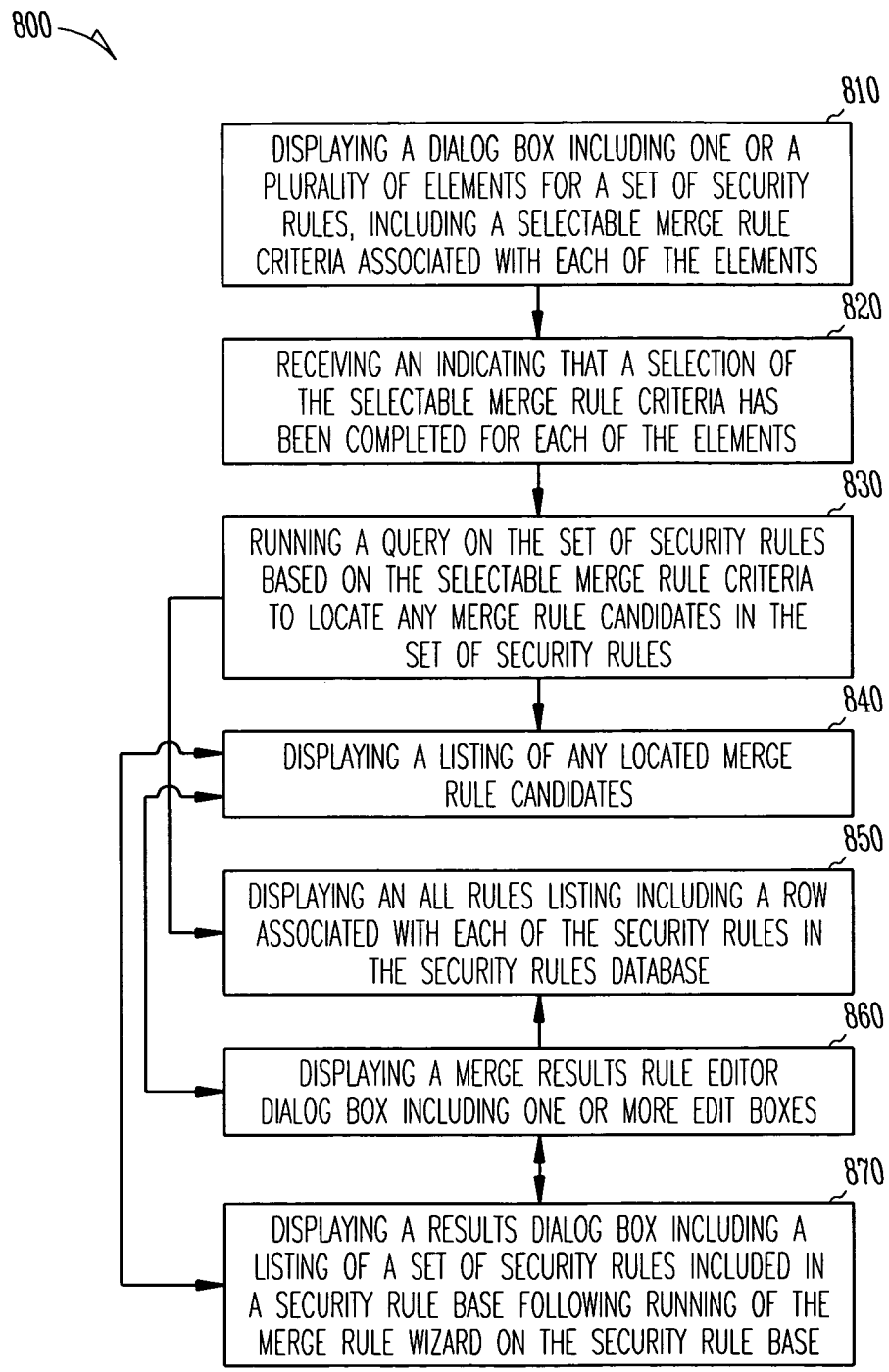
FIG. 8 shows a flowchart of one or more methods according to various embodiments.

In various embodiments, the disk drive unit 716 includes a machine-readable medium 722 on which is stored one or more sets of instructions (e.g., software 724) embodying any one or more of the methodologies or functions described herein, including those methods illustrated in FIG. 8. In various embodiments, the instructions 724 are stored in, completely or at least partially, within the main memory 704, the static memory 706, and/or within the processor 702 during execution thereof. In various embodiments, the main memory 704 and the processor 702 also constitute a machine-readable media. In various embodiments, the instructions 724 are further transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the various embodiments described. The term "machine-readable medium" shall accordingly be taken to include, but not be limited to, solid-state memories, optical and magnetic media, and carrier wave signals.

FIG. 8 shows a flowchart of one or more methods 800 according to various embodiments. It should be noted that the methods described herein do not have to be executed in the order described, or in any particular order. Moreover, various activities described with respect to the methods identified herein can be executed in repetitive, simultaneous, serial, or parallel fashion.

At block 810, method 800 includes displaying a dialog box including one or a plurality of elements for a set of security rules, including a selectable merge rule criteria associated with one or more of the plurality of elements.

At block 820, method 800 includes receiving an indication that a selection of the selectable merge rule criteria has been completed for the one or more of the plurality of elements. In various embodiments, receiving an indication that a selection of the selectable merge criteria has been completed for the one or more of the plurality of elements includes accepting a default selection for a merge criteria for a least one of the plurality of elements.

At block 830, method 800 includes running a query on the set of security rules based on the selectable merge rule criteria to locate any candidate security rules in the set of security rules. In various embodiments, running a query includes running a Structured Query Language query on the set of security rules. In various embodiments, running a query on the set of security rules based on the selectable merge rule criteria includes merging multiple existing rule sets in the security rule base and running the query on the security rule base including the multiple existing rules sets.

In various embodiments, running a query on the set of security rules based on the selectable merge rule criteria to locate any candidate security rules in the set of security rules is performed on some periodic time basis when no known new security rules and no known changes to the security rule base have been performed as an auditing function, and generating a warning if any security rule in the security rule base renders another security rule in the security rule base inoperative.

At block 840, method 800 includes displaying a listing of any located candidate security rules. In various embodiments, displaying the list of any located candidate merge rules includes displaying a selectable field for each of the merge rule candidates being displayed, the selectable field operable to allow an indication as to whether the merge rule candidate associated with the selection fields is accepted or rejected. Various embodiments include generating a warning if any given one of the security rules is the multiple existing rule sets will obsolete any given one or more of the security rules in the security rule base.

At block 850, method 800 includes displaying an all rules listing including a row associated with each of the security rules in the security rules database. In various embodiments, displaying the all rules listing includes displaying a row associated with each of the security rules in the security rules base and the displayed rows arranged in order by rule number.

At block 860, method 800 includes displaying a merge results rule editor dialog box including one or more edit boxes operable to allow a user to edit the entries included in a given element for a given candidate security rule.

At block 870, method 800 includes displaying a results dialog box including a listing of a set of security rules included in a security rule base following running of the merge rule wizard on the security rule base and after any merges have been performed on each of the candidate security rules.

Various embodiments including systems and methods have been described herein. Various embodiments include a system comprising an interface coupled to a computer network, the interface operable to provide a merge rule wizard operable to generate one or more displayable dialog boxes that include selectable criteria for merging a plurality of sets of security rules into a single security rule base.

Various embodiments include a method comprising displaying a dialog box including one or a plurality of elements for a set of security rules, including a selectable merge rule criteria associated with one or more of the plurality of elements receiving an indication that a selection of the selectable merge rule criteria has been completed for the one or more of the plurality of elements, running a query on the set of security rules based on the selectable merge rule criteria to locate any candidate security rules in the set of security rules, and displaying a listing of any located candidate security rules.

Various embodiments include a merge rule wizard comprising instructions operable to generate and display a first displayable dialog box including a plurality of elements, each of the elements having at least one selectable merge criteria, instruction operable to allow an indication of a selection of a merge criteria for one or more of the elements having at least one selectable merge criteria, instructions operable to run a query on a security rule base based on the selection of the merge criteria for the one or more elements having at lease one selectable merge criteria, and instruction operable to generate and display a second displayable dialog box including displaying a merge rule result listing including a listing of any candidates security rules based on the results of the query.

Various embodiments, include a computer memory device storing instructions that when executed perform a method comprising displaying a dialog box including one or a plurality of elements for a set of security rules, including a selectable merge rule criteria associated with each of the elements, receiving an indicating that a selection of the selectable merge rule criteria has been completed for each of the elements, running a query on the set of security rules based on the selectable merge rule criteria to locate any candidates security rules in the set of security rules, and displaying a listing of any located candidate security rules.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A system comprising:
a computer coupled to a computer network, the computer operable to execute a merge rule wizard operable to generate one or more displayable dialog boxes that include selectable criteria for merging a plurality of sets of security rules into a single security rule base;
the computer including at least one input device operable to allow a user to make a selection of one or more selectable fields displayed in at least one of the one or more displayable dialog boxes, the selectable fields corresponding to a merge criteria and associated with a field from a security rule, wherein the security rule comprises a plurality of fields with values;
wherein a first displayable dialog box generated by the merge rule wizard includes at least one selectable merge criteria, the at least one selectable merge criteria associated with a value of a field of a plurality of the security rules in the single security rule base; and
wherein upon receiving an indication that the selection of the one or more selectable fields has been completed, the merge rule wizard is operable to run a query on the single security rule base based on the selection of the at least one selectable merge criteria, and to automatically generate and display a listing of any located candidate merge rules.

2. The system of claim 1, including a single enterprise manager operable to store the single security rule base and to manage a set of security policies for the computer network based on the single security rule base.

3. The system of claim 1, wherein the single security rule base includes security rules for controlling authentication of a plurality of computer network users and security rules for controlling accessing one or more resources included in the computer network.

4. The system of claim 1, wherein a second displayable dialog box generated by the merge rule wizard includes a plurality of edit boxes, each of the plurality of edit boxes operable to allow editing of the settings of values for a field of a given candidate merge rule.

5. The system of claim 1, wherein a third displayable dialog box generated by the merge rule wizard includes a summary listing of all of the security rules in the single security rule base based on which the merge rules wizard is run.

6. The system of claim 1, wherein the computer is further operable to display a warning message when a given one of the security rules in the single security rule base renders obsolete any other given one or more security rules in the single security rules base.

7. A merge rule wizard executing on one or more processors of a computer system connected to a computer network, the merge rule wizard including a method comprising:
displaying, on a display device communicatively coupled to a computer system, a dialog box including one or a plurality of elements for a set of security rules, the dialog box including a selectable merge rule criteria associated with one or more of the plurality of elements;
receiving an indication that a selection from the displayed dialog box of the selectable merge rule criteria has been completed for the one or more of the plurality of elements;
running a query on the set of security rules based on the selectable merge rule criteria to locate any candidate security rules in the set of security rules, the candidate security rules comprising a plurality of fields with values wherein each of the candidate security rules conforms to the selectable merge rule criteria; and
displaying a listing of any located candidate security rules.

8. The method of claim 7, wherein running a query includes running a Structured Query Language query on the set of security rules.

9. The method of claim 7, including displaying an all rules listing including a row associated with each of the security rules in the security rules database.

10. The method of claim 7, including displaying a merge results rule editor dialog box including one or more edit boxes operable to allow a user to edit the entries included in a given element for a given candidate security rule.

11. The method of claim 7, including displaying a results dialog box including a listing of a set of security rules included in a security rule base following running of the merge rule wizard on the security rule base and after any merges have been performed on each of the candidate security rules.

12. The method of claim 7, wherein receiving an indication that a selection from the displayed dialog box of the selectable merge criteria has been completed for the one or more of the plurality of elements includes accepting a default selection for a merge criteria for a least one of the plurality of elements.

13. The method of claim 7, wherein displaying the listing of any located candidate security rules includes displaying a selectable field for each of the candidate security rules being displayed, the selectable field operable to allow an indication as to whether the candidate security rule associated with the selection fields is accepted or rejected.

14. The method of claim 7, wherein running a query on the set of security rules based on the selectable merge rule criteria further comprises adding a new security rule to the security rule base, running a query on the set of security rules including the added new security rule, and generating a warning if the new rule will obsolete any one or more of an existing security rule in the security rule base.

15. The method of claim 7, wherein running a query on the set of security rules based on the selectable merge rule criteria includes merging multiple existing rule sets in the security rule base and running a query on the security rule base including the multiple existing rules sets.

16. The method of claim 7, wherein running a query on the set of security rules based on the selectable merge rule criteria to locate any candidate security rules in the set of security rules comprises;
running the query as an auditing function on some periodic time basis when no known new security rules and no known changes to the security rule base have been performed; and
generating a warning if any security rule in the security rule base renders another security rule in the security rule base inoperative.

17. The method of claim 9, wherein displaying the all rules listing includes displaying a row associated with each of the security rules in the security rules base and the displayed rows arranged in order by rule number.

18. The method of claim 15, including generating a warning if any given one of the security rules is the multiple existing rule sets will obsolete any given one or more of the security rules in the security rule base.

19. A merge rule wizard executing on one or more processors of a computer system connected to a computer network wherein the merge rule wizard comprises instructions to cause the one or more processors to:
generate and display a first displayable dialog box including a plurality of elements, each of the elements having at least one selectable merge criteria,
receive an indication of a selection of a merge criteria for one or more of the elements having at least one selectable merge criteria,
run a query on a security rule base based on the selection of the merge criteria for the one or more elements having at least one selectable merge criteria to locate candidate security rules in the security rule base, the candidate security rules comprising a plurality of fields with values wherein each of the candidate entries conforms to the selectable merge rule criteria; and
generate and display a second displayable dialog box including displaying a merge rule result listing including a listing of any candidates security rules based on the results of the query.

20. The merge rule wizard of claim 19, wherein the query is a Structured Query Language query.

21. The merge rule wizard of claim 19, wherein the at least one of the at least one selectable merge criteria is a merge operation operable to combine all values for a given one of the one or more elements when merging a set of security rules from the security rules base with other security rules from the security rules base.

22. The merge rule wizard of claim 19, wherein at least one of the merge criteria is a compare operation operable to compare values for a given one of the one or more elements when merging a set of security rules from the security rules base with other security rules from the security rules base, and to merge any security rules within the security rule base only if a value for the given one of the one or more elements is identical.

23. The merge rule wizard of claim 19, wherein at least one of the selectable merge criteria is an ignore criteria operable when selected for a particular element of the plurality of elements to disregard a value associated with the particular element in determining whether or not a security rule is merged with any other security rules to form a candidate security rule.

24. A computer memory device storing instructions that when executed cause a processor to:
display a dialog box including one or a plurality of elements for a set of security rules, including a selectable merge rule criteria associated with each of the elements;
receive an indication that a selection of the selectable merge rule criteria has been completed for each of the elements;
run a query on the set of security rules based on the selectable merge rule criteria to locate any candidates security rules in the set of security rules, the candidate security rules comprising a plurality of fields with values wherein each of the candidate security rules conforms to the selectable merge rule criteria; and
display a listing of any located candidate security rules.

* * * * *